United States Patent [19]

Bylsma

[11] 4,103,474
[45] Aug. 1, 1978

[54] THREE POINT HITCH APPARATUS FOR SUPPORTING AN IMPLEMENT UNDERNEATH A TRACTOR

[75] Inventor: Simon Bylsma, Temple, Tex.

[73] Assignee: Continental Belton Co., Belton, Tex.

[21] Appl. No.: 789,659

[22] Filed: Apr. 21, 1977

[51] Int. Cl.² .............. A01B 63/104; A01D 35/262
[52] U.S. Cl. ............................... 56/15.9; 56/6; 172/297; 172/781; 280/461 A
[58] Field of Search ............ 280/461 A, 481, 495, 280/415 A, 415 B, 400; 172/273, 781, 297, 439, 788, 298, 307; 56/7, DIG. 22, 6, 15.9

[56] References Cited

U.S. PATENT DOCUMENTS

| | | | |
|---|---|---|---|
| 2,936,561 | 5/1960 | Grimes | 56/7 |
| 2,949,004 | 8/1960 | Jones | 56/DIG. 22 |
| 3,618,671 | 11/1971 | Chantland | 172/297 |
| 3,930,543 | 1/1976 | Maurer | 172/273 |

*Primary Examiner*—John A. Pekar
*Attorney, Agent, or Firm*—Rudolph L. Lowell

[57] ABSTRACT

A three-point mounting hitch for supporting an implement beneath a tractor and between the front and rear wheels thereof includes an upright rear frame member connectible with the tractor three-point hitch and a horizontal implement supporting frame member at the lower end of the rear frame member extended forwardly below the tractor. The implement is raised and lowered as a unit assembly with the three-point hitch into and out of an operating position. A belt drive mechanism on the hitch connects the tractor power take-off unit to the implement drive shaft.

9 Claims, 5 Drawing Figures

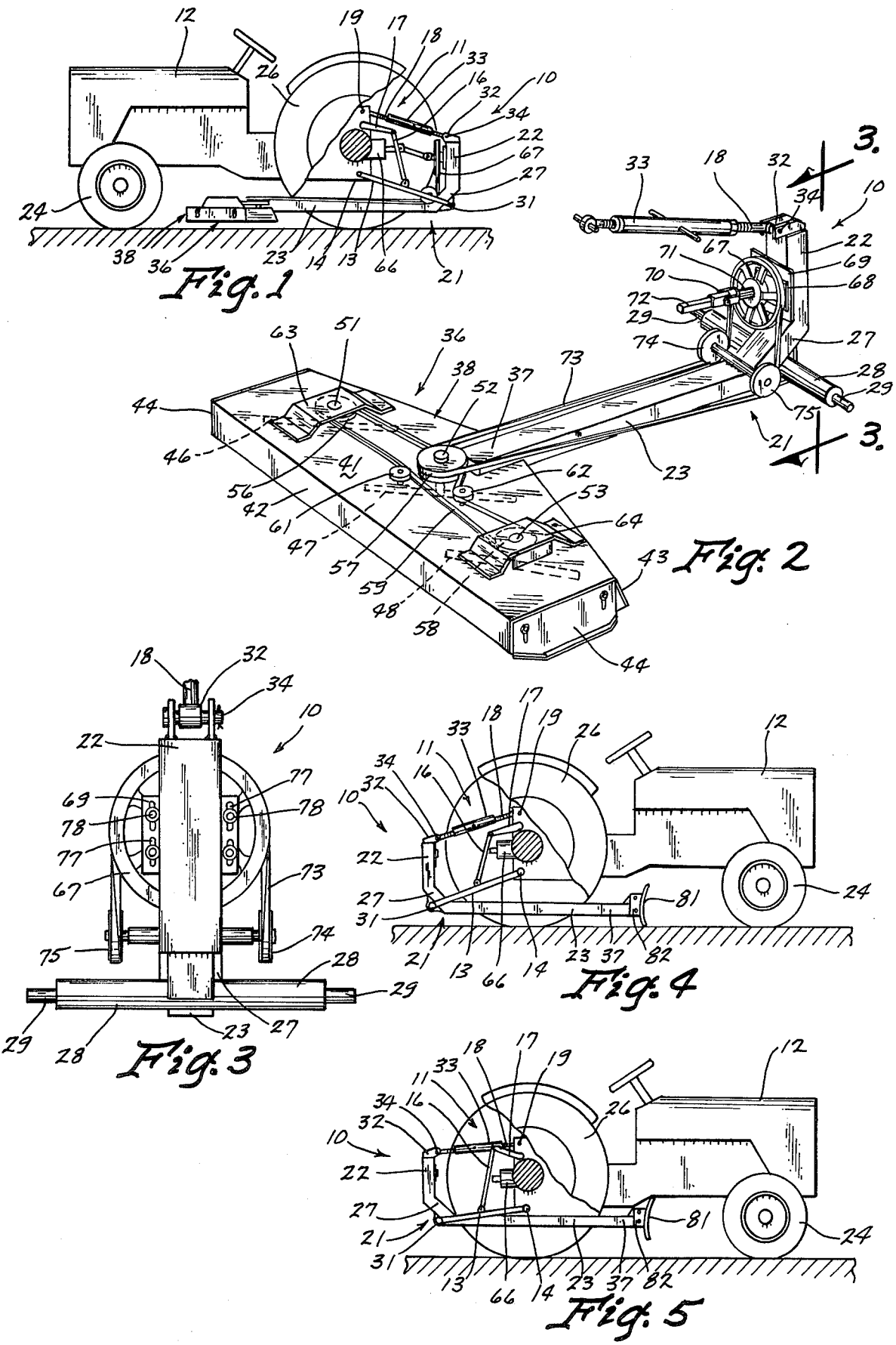

THREE POINT HITCH APPARATUS FOR SUPPORTING AN IMPLEMENT UNDERNEATH A TRACTOR

SUMMARY OF THE INVENTION

The three-point mounting hitch of the present invention is connected directly to the tractor three-point hitch to support an implement beneath the tractor at a position forwardly of the tractor rear wheels. The hitch is quickly and easily attached to the usual three-point hitch of a tractor without requiring chains, brackets or like means for connection with the tractor. Likewise, the implement is fully supported on the base frame of the hitch apparatus without the use of any dolly or support wheels and at a position fowardly of the tractor rear wheels for convenient observation by the tractor operator. The rear mounting of the hitch apparatus provides ready access to the tractor power take-off unit for operative connection to the implement by a belt drive means on the hitch apparatus. The apparatus, and in turn the implement, is movable up and down beneath the tractor in direct response to the up and down movement of the tractor three-point hitch.

BRIEF DESCRIPTION OF THE DRAWINGS

FIG. 1 is a side elevational view of a farm tractor shown in assembly relation with the hitch apparatus of the present invention with parts broken away for clarity;

FIG. 2 is an enlarged perspective view of the hitch apparatus showing a mower implement supported thereon;

FIG. 3 is an enlarged rear elevational view of the hitch apparatus, taken along line 3—3 in FIG. 2;

FIG. 4 is a side elevational view, illustrated similarly to FIG. 1, showing a blade supported on the hitch apparatus in a lowered working position; and FIG. 5 is a side elevational view, similar to FIG. 4, showing the hitch apparatus raised to a transport position.

DETAILED DESCRIPTION OF THE INVENTION

The three-point hitch apparatus of the present invention, indicated generally at 10, is shown in FIG. 1 in assembly relation with the three-point hitch 11 of a usual farm tractor 12 which includes a pair of rearwardly extended transversely spaced lift arms 13 pivotally connected to the tractor at 14 and raised and lowered by lift linkages 16 that are connected to power driven rock arms 17. A center link 18, pivotally connected to the tractor at 19 above and between the lift arm connections 14, completes the tractor three-point hitch.

The three-point hitch apparatus includes a main frame structure 21 of a generally right angle shape having an upright frame section or leg 22 arranged rearwardly of the tractor and a horizontal frame section or leg 23 extended forwardly from the upright leg 22 for termination at a position between the front and rear wheels 24 and 26, respectively, of the tractor 12. The leg sections 22 and 23 are joined at their adjacent ends by an upwardly and rearwardly inclined connecting section 27 to the underside of which is connected a transversely extended support arm 28. Stub shafts 29 at the opposite ends of the support arm 28 are connectible to the rear ends 31 of the lift arms 13.

With the lift arms 13 connected to the transverse support arm 28 the third point or center link 18 on the tractor 12 is connected to a center link or third point 32 on the hitch apparatus 10 by a linearly adjustable connecting arm or turn buckle 33. The adjustable arm 33 is adjusted to a length such that the distance between the pivot connections 19 and 34 of the center links 18 and 32, respectively, is substantially equal to the distance between the connections 14 and 31 of the lift arms 13. It will also be noted that the vertical distance between the rear connections 31 and 34 is substantially equal to the vertical spacing of the forward connections 14 and 19. The adjustable arm 33 and center links 18 and 32 thus form a parallel link system with the lift arms 13 to provide for the up and down movement of the leg 23 in a horizontally extended position in response to the actuation of the lift linkages 16.

Referring to FIG. 2, a mower implement 36 is supported on a forward portion 37 of the horizontal leg 23 by means of a transversely extended hood structure or housing 38 which includes a top wall 41, front and rear walls 42 and 43, respectively, and vertically adjustable side walls 44. The mower 36 includes three horizontal cutting blades 46, 47 and 48 secured to the lower ends of vertically disposed shafts 51, 52 and 53, respectively, which are rotatably carried on the housing top wall 41 at transversely spaced positions providing a working clearance between the mower blades. Pulleys 56, 57 and 58 are secured to the respective shafts 51, 52 and 53 above the top wall 41 with a continuous belt 59 trained about them. A pair of idler pulleys 61 and 62 are positioned on the top wall 41 adjacent the center pulley 57 to assure a positive drive action between the belt 59 and center pulley 57. Shield plates 63 and 64 are installed on the top wall 41 over the outer pulleys 56 and 58 for safety.

Power for rotating the mower blades is taken from the tractor power take off unit 66 (FIG. 1) by a power transmission means on the hitch apparatus including a main drive pulley 67 (FIG. 2) mounted for rotation about a longitudinal axis on a support plate 68 secured to a face plate 69 on the front of the upstanding leg 22. A usual universal type coupling 70 interconnects the shaft 71 of the main drive pulley 67 with the tractor PTO output shaft 72. A second continuous belt 73 is trained about the main drive pulley 67 and about a pair of idler pulleys 74 and 75 supported on the main frame 21 below the main drive pulley 67 for rotation about a transverse axis to effect a change in direction of the belt 73 for driving the shaft 52 of the center mower blade 47. For this purpose, the center pulley 57 is a double pulley with the belt 59 trained around the lower portion thereof and the belt 73 trained around the upper portion thereof.

It can be seen in FIG. 3 that the face plate 69 is provided with vertical slots 77 for receiving fastening bolts 78 for the main drive pulley support plate 68. The bolt and slot connections between the plates 68 and 69 thus provide for vertical adjustment of the main drive pulley 67 relative to the idler pulleys 74 and 75 for adjusting the tension in belt 73.

Many implements may be utilized in connection with the hitch apparatus of the present invention which do not require a separate power hook up with the tractor PTO, such as the blade 81 shown in FIGS. 4 and 5.

Blade 81 is mounted directly onto the forward portion 37 of the horizontal leg 23 by a suitable bracket 82.

In operation, an implement supported on the mounting hitch of the present invention is fully controllable by an operator from the driver's seat of the tractor. For example, blade 81 is movable up and down between the lowered working position shown in FIG. 4 and the raised transport position shown in FIG. 5 simply by manipulation of the usual three-point hitch controls. Likewise, the cutting blades of the mower implement shown in FIGS. 1 and 2 can be rotated or stopped by manipulation of the usual tractor PTO controls.

As the mounting hitch is moved between the lowered working position of FIG. 4 and the raised transport position of FIG. 5, the generally horizontal inclination of the main frame leg 23 is maintained by the above described parallel link system.

Although the invention has been described with respect to a preferred embodiment thereof, it is to be understood that it is not to be so limited since changes can be made therein which are within the full intended scope of this invention defined by the appended claims.

I claim:

1. Hitch apparatus for supporting an implement beneath a tractor having a rear mounted three-point hitch, comprising:
   (a) an integral main frame having a generally upright rear frame section and a generally horizontal implement supporting frame section extended forwardly of the rear frame section,
   (b) means connecting a link of said three-point linkage to an upper portion of said upright rear frame section and connecting at least one other arm of said three point linkage to said main frame adjacent a lower portion of said upright rear frame section for vertical movement of the implement supporting frame section in a substantially horizontally extended position in direct response to movement of the three-point hitch.
   (c) said horizontal implement supporting frame section positioned beneath the tractor when said connector means is connected to the tractor three-point hitch, and
   (d) means for supporting an implement on said horizontal section.

2. The hitch apparatus according to claim 1, wherein:
   (a) said tractor three-point hitch includes a center link pivotally connected to the tractor and extended rearwardly therefrom and a pair of transversely spaced lift arms connected to the tractor for up and down pivotal movement and extended rearwardly therefrom below the center link, and
   (b) said connecting means and rear frame section forming a parallel link system with said center link and lift arms to provide for a vertical movement of the implement supporting frame section in a horizontally extended position in response to an up and down pivotal movement of the lift arms.

3. The hitch apparatus, according to claim 1, wherein:
   (a) said center link is linearly adjustable.

4. The hitch apparatus, according to claim 1, wherein:
   (a) said tractor is equipped with a rear power take-off unit and said implement includes a drive shaft, and
   (b) a power transmission means on said main frame connectible with the tractor power take-off unit and implement drive shaft.

5. The hitch apparatus, according to claim 4, wherein:
   (a) said power transmission means includes a drive pulley,
   (b) means for rotatably supporting the drive pulley on said rear frame section,
   (c) a pair of transversely spaced idler pulleys supported on the horizontal frame section below the drive pulley, and
   (d) a continuous belt trained about the drive pulley, idler pulleys and implement drive shaft.

6. The hitch apparatus, according to claim 5, comprising:
   (a) means for adjusting the tension in the continuous belt.

7. Hitch apparatus for supporting an implement on and beneath a tractor having a three-point hitch which includes a pair of elongated transversely spaced lift arms pivotally supported on the tractor and extended rearwardly therefrom and an elongated center link pivotally connected to the tractor above and between the lift arms, said hitch apparatus comprising:
   (a) an integral main frame of a generally right angle shape having an upright leg with upper and lower portions and a generally horizontal implement supporting leg extended forwardly from said upright leg,
   (b) means for pivotally connecting the center link to said upper portion of the upright leg,
   (c) means for pivotally connecting the lift arms to the main frame at transversely spaced positions adjacent the juncture of the upright and horizontal legs, and
   (d) means for supporting an implement on the horizontal leg forwardly of the upright leg,
   (e) said upright leg, center link and lift arms forming a parallel link system for vertical movement of the implement supporting leg in a horizontally extended position in direct response to up and down movement of the lift arms.

8. The hitch apparatus, according to claim 7, wherein:
   (a) said tractor is equipped with a rear power take-off unit and said implement includes a drive shaft, and
   (b) a power transmission means on said main frame connectible with the tractor power take-off unit and implement drive shaft.

9. The hitch apparatus, according to claim 8, wherein:
   (a) said implement includes at least one movable cutting blade operatively associated with said drive shaft, and said means for supporting an implement on the horizontal leg includes a housing, and
   (b) means for operatively supporting the drive shaft and cutting blade on the housing.

* * * * *